United States Patent
Park et al.

(10) Patent No.: US 8,023,731 B2
(45) Date of Patent: Sep. 20, 2011

(54) APPARATUS AND METHOD FOR HISTOGRAM ANALYSIS OF IMAGE AND LUMINANCE COMPENSATION APPARATUS USING THE SAME

(75) Inventors: Jung-Hoon Park, Suwon-si (KR); Young-Min Jeong, Suwon-si (KR); Sung-Dae Cho, Yongin-si (KR); Yun-Je Oh, Yongin-si (KR)

(73) Assignee: Samsung Electronics Co., Ltd, Suwon-si, Gyeonggi-do, Korea (KR)

( * ) Notice: Subject to any disclaimer, the term of this patent is extended or adjusted under 35 U.S.C. 154(b) by 1045 days.

(21) Appl. No.: 11/636,905

(22) Filed: Dec. 11, 2006

(65) Prior Publication Data

US 2007/0183660 A1 Aug. 9, 2007

(30) Foreign Application Priority Data

Feb. 8, 2006 (KR) .................. 10-2006-0012144

(51) Int. Cl.
*G06K 9/00* (2006.01)
(52) U.S. Cl. ....................................... 382/168
(58) Field of Classification Search ............ 382/168
See application file for complete search history.

(56) References Cited

U.S. PATENT DOCUMENTS

| | | | |
|---|---|---|---|
| 5,450,502 A * | 9/1995 | Eschbach et al. | 382/169 |
| 5,875,262 A * | 2/1999 | Asada | 382/169 |
| 6,049,626 A * | 4/2000 | Kim | 382/167 |
| 2003/0139886 A1* | 7/2003 | Bodzin et al. | 702/28 |
| 2004/0081356 A1* | 4/2004 | Shimizu et al. | 382/166 |
| 2005/0223019 A1* | 10/2005 | Das et al. | 707/102 |
| 2006/0268180 A1* | 11/2006 | Chou | 348/673 |
| 2007/0110332 A1* | 5/2007 | Asano et al. | 382/275 |

FOREIGN PATENT DOCUMENTS

| | | |
|---|---|---|
| JP | 09-065252 | 3/1997 |
| JP | 2000-057335 | 2/2000 |
| JP | 2003-256833 | 9/2003 |
| JP | 2010130150 A * | 6/2010 |
| KR | 2001-036671 | 5/2001 |
| KR | 2005-042699 | 5/2005 |

* cited by examiner

*Primary Examiner* — Brian Werner
*Assistant Examiner* — Nirav G Patel
(74) *Attorney, Agent, or Firm* — Cha & Reiter, LLC

(57) ABSTRACT

Disclosed is an apparatus and method for analyzing a histogram of an image, the apparatus comprising an image input module for buffering an input image, a block calculator for performing a blocking operation for dividing the image into pixel blocks of a predetermined size, and extracting and outputting a representative pixel of each block obtained in a corresponding blocking, a probability density function (PDF) operator for calculating a first histogram using all pixels of the image, and calculating a second histogram using the representative pixels input from the block calculator, and an image characteristic comparator for receiving the first and second histograms determining whether the received histograms satisfy an identity criterion and calculating a third histogram of a following image when the identity criterion is satisfied.

14 Claims, 10 Drawing Sheets

| | | | |
|---|---|---|---|
| 1 | | 1 GROUP : 4 | 1 GROUP : 4 |
| 2 | | 2 GROUP : 4 | 2 GROUP : 4 |
| 3 | | 3 GROUP : 4 | 3 GROUP : 4 |
| 4 | | 4 GROUP : 4 | 4 GROUP : 4 |
| 5 | | 5 GROUP : 4 | 5 GROUP : 4 |
| 6 | | 6 GROUP : 4 | 6 GROUP : 4 |
| 7 | | 7 GROUP : 4 | 7 GROUP : 4 |
| 8 | | 8 GROUP : 4 | 8 GROUP : 4 |
| 9 | | 9 GROUP : 5 | 9 GROUP : 5 |
| 10 | | 10 GROUP : 5 | 10 GROUP : 5 |
| 11 | | 11 GROUP : 5 | 11 GROUP : 5 |
| 12 | | 12 GROUP : 5 | 12 GROUP : 5 |
| 13 | | 13 GROUP : 5 | 13 GROUP : 5 |
| 14 | | 14 GROUP : 5 | 14 GROUP : 5 |
| 15 | | 15 GROUP : 5 | 15 GROUP : 5 |
| 16 | | 16 GROUP : 5 | 16 GROUP : 5 |
| 17 | | 17 GROUP : 5 | 17 GROUP : 5 |
| 18 | | 18 GROUP : 5 | 18 GROUP : 5 |
| 19 | | 19 GROUP : 5 | 19 GROUP : 5 |
| 20 | | 20 GROUP : 5 | 20 GROUP : 5 |
| 21 | | 21 GROUP : 4 | 21 GROUP : 4 |
| 22 | | 22 GROUP : 4 | 22 GROUP : 4 |
| 23 | | 23 GROUP : 4 | 23 GROUP : 4 |
| 24 | | 24 GROUP : 4 | 24 GROUP : 4 |
| 25 | <! | 25 GROUP : 5 | |
| | !> | | 25 GROUP : 4 |
| 26 | | 26 GROUP : 5 | 26 GROUP : 5 |
| 27 | | 27 GROUP : 4 | 27 GROUP : 4 |
| 28 | | 28 GROUP : 4 | 28 GROUP : 4 |
| 29 | | 29 GROUP : 4 | 29 GROUP : 4 |
| 30 | | 30 GROUP : 4 | 30 GROUP : 4 |
| 31 | | 31 GROUP : 4 | 31 GROUP : 4 |
| 32 | | 32 GROUP : 4 | 32 GROUP : 4 |
| 33 | | 33 GROUP : 4 | 33 GROUP : 4 |
| 34 | | 34 GROUP : 4 | 34 GROUP : 4 |
| 35 | | 35 GROUP : 4 | 35 GROUP : 4 |
| 36 | | 36 GROUP : 4 | 36 GROUP : 4 |
| 37 | | 37 GROUP : 4 | 37 GROUP : 4 |
| 38 | | 38 GROUP : 4 | 38 GROUP : 4 |
| 39 | | 39 GROUP : 4 | 39 GROUP : 4 |
| 40 | | 40 GROUP : 4 | 40 GROUP : 4 |
| 41 | | 41 GROUP : 4 | 41 GROUP : 4 |
| 42 | | 42 GROUP : 4 | 42 GROUP : 4 |
| 43 | | 43 GROUP : 4 | 43 GROUP : 4 |
| 44 | | 44 GROUP : 4 | 44 GROUP : 4 |
| 45 | | 45 GROUP : 4 | 45 GROUP : 4 |
| 46 | | 46 GROUP : 4 | 46 GROUP : 4 |
| 47 | | 47 GROUP : 4 | 47 GROUP : 4 |
| 48 | | 48 GROUP : 4 | 48 GROUP : 4 |
| 49 | | 49 GROUP : 4 | 49 GROUP : 4 |
| 50 | | 50 GROUP : 4 | 50 GROUP : 4 |
| 51 | | 51 GROUP : 4 | 51 GROUP : 4 |
| 52 | | 52 GROUP : 4 | 52 GROUP : 4 |
| 53 | | 53 GROUP : 4 | 53 GROUP : 4 |
| 54 | | 54 GROUP : 4 | 54 GROUP : 4 |
| 55 | | 55 GROUP : 4 | 55 GROUP : 4 |
| 56 | | 56 GROUP : 4 | 56 GROUP : 4 |
| 57 | | 57 GROUP : 4 | 57 GROUP : 4 |
| 58 | | 58 GROUP : 4 | 58 GROUP : 4 |
| 59 | | 59 GROUP : 4 | 59 GROUP : 4 |
| 60 | | 60 GROUP : 4 | 60 GROUP : 4 |
| 61 | | 61 GROUP : 4 | 61 GROUP : 4 |
| 62 | | 62 GROUP : 4 | 62 GROUP : 4 |
| 63 | | 63 GROUP : 4 | 63 GROUP : 4 |
| 64 | | 64 GROUP : 4 | 64 GROUP : 4 |
| 65 | | 65 GROUP : 1 | 65 GROUP : 1 |

FIG.7A

| | | | |
|---|---|---|---|
| 134 | | 134 GROUP : 4 | 134 GROUP : 4 |
| 135 | | 135 GROUP : 4 | 135 GROUP : 4 |
| 136 | | 136 GROUP : 4 | 136 GROUP : 4 |
| 137 | | 137 GROUP : 4 | 137 GROUP : 4 |
| 138 | <! | 138 GROUP : 5 | |
| | !> | | 138 GROUP : 4 |
| 139 | | 139 GROUP : 5 | 139 GROUP : 5 |
| 140 | | 140 GROUP : 5 | 140 GROUP : 5 |
| 141 | | 141 GROUP : 4 | 141 GROUP : 4 |
| 142 | | 142 GROUP : 4 | 142 GROUP : 4 |
| 143 | | 143 GROUP : 4 | 143 GROUP : 4 |
| 144 | | 144 GROUP : 4 | 144 GROUP : 4 |
| 145 | | 145 GROUP : 4 | 145 GROUP : 4 |
| 146 | | 146 GROUP : 4 | 146 GROUP : 4 |
| 147 | | 147 GROUP : 4 | 147 GROUP : 4 |
| 148 | | 148 GROUP : 4 | 148 GROUP : 4 |
| 149 | | 149 GROUP : 4 | 149 GROUP : 4 |
| 150 | | 150 GROUP : 4 | 150 GROUP : 4 |
| 151 | | 151 GROUP : 4 | 151 GROUP : 4 |
| 152 | | 152 GROUP : 4 | 152 GROUP : 4 |
| 153 | | 153 GROUP : 4 | 153 GROUP : 4 |
| 154 | | 154 GROUP : 4 | 154 GROUP : 4 |
| 155 | | 155 GROUP : 4 | 155 GROUP : 4 |
| 156 | | 156 GROUP : 4 | 156 GROUP : 4 |
| 157 | | 157 GROUP : 4 | 157 GROUP : 4 |
| 158 | | 158 GROUP : 4 | 158 GROUP : 4 |
| 159 | | 159 GROUP : 4 | 159 GROUP : 4 |
| 160 | | 160 GROUP : 4 | 160 GROUP : 4 |
| 161 | | 161 GROUP : 4 | 161 GROUP : 4 |
| 162 | | 162 GROUP : 4 | 162 GROUP : 4 |
| 163 | | 163 GROUP : 4 | 163 GROUP : 4 |
| 164 | | 164 GROUP : 4 | 164 GROUP : 4 |
| 165 | | 165 GROUP : 4 | 165 GROUP : 4 |
| 166 | | 166 GROUP : 4 | 166 GROUP : 4 |
| 167 | | 167 GROUP : 4 | 167 GROUP : 4 |
| 168 | | 168 GROUP : 4 | 168 GROUP : 4 |
| 169 | | 169 GROUP : 4 | 169 GROUP : 4 |
| 170 | | 170 GROUP : 4 | 170 GROUP : 4 |
| 171 | | 171 GROUP : 4 | 171 GROUP : 4 |
| 172 | | 172 GROUP : 4 | 172 GROUP : 4 |
| 173 | | 173 GROUP : 4 | 173 GROUP : 4 |
| 174 | | 174 GROUP : 4 | 174 GROUP : 4 |
| 175 | | 175 GROUP : 4 | 175 GROUP : 4 |
| 176 | | 176 GROUP : 4 | 176 GROUP : 4 |
| 177 | | 177 GROUP : 4 | 177 GROUP : 4 |
| 178 | | 178 GROUP : 1 | 178 GROUP : 1 |
| 179 | | 179 GROUP : 1 | 179 GROUP : 1 |
| 180 | | 180 GROUP : 1 | 180 GROUP : 1 |
| 181 | | 181 GROUP : 1 | 181 GROUP : 1 |
| 182 | | 182 GROUP : 1 | 182 GROUP : 1 |
| 183 | | 183 GROUP : 1 | 183 GROUP : 1 |
| 184 | | 184 GROUP : 1 | 184 GROUP : 1 |
| 185 | | 185 GROUP : 1 | 185 GROUP : 1 |
| 186 | | 186 GROUP : 1 | 186 GROUP : 1 |
| 187 | | 187 GROUP : 1 | 187 GROUP : 1 |
| 188 | | 188 GROUP : 1 | 188 GROUP : 1 |
| 189 | | 189 GROUP : 1 | 189 GROUP : 1 |
| 190 | | 190 GROUP : 1 | 190 GROUP : 1 |
| 191 | | 191 GROUP : 1 | 191 GROUP : 1 |
| 192 | | 192 GROUP : 1 | 192 GROUP : 1 |
| 193 | | 193 GROUP : 1 | 193 GROUP : 1 |
| 194 | | 194 GROUP : 1 | 194 GROUP : 1 |
| 195 | | 195 GROUP : 1 | 195 GROUP : 1 |
| 196 | | 196 GROUP : 1 | 196 GROUP : 1 |
| 197 | | 197 GROUP : 1 | 197 GROUP : 1 |
| 198 | | 198 GROUP : 1 | 198 GROUP : 1 |

FIG. 7B

| | | |
|---|---|---|
| 243 | 243 GROUP : 4 | 243 GROUP : 4 |
| 244 | 244 GROUP : 4 | 244 GROUP : 4 |
| 245 | 245 GROUP : 4 | 245 GROUP : 4 |
| 246 | 246 GROUP : 4 | 246 GROUP : 4 |
| 247 | 247 GROUP : 4 | 247 GROUP : 4 |
| 248 | 248 GROUP : 4 | 248 GROUP : 4 |
| 249 | 249 GROUP : 4 | 249 GROUP : 4 |
| 250 | 250 GROUP : 4 | 250 GROUP : 4 |
| 251 | 251 GROUP : 4 | 251 GROUP : 4 |
| 252 | 252 GROUP : 4 | 252 GROUP : 4 |
| 253 | 253 GROUP : 4 | 253 GROUP : 4 |
| 254 | 254 GROUP : 4 | 254 GROUP : 4 |
| 255 | 255 GROUP : 4 | 255 GROUP : 4 |
| 256 | 256 GROUP : 4 | 256 GROUP : 4 |
| 257 | 257 GROUP : 4 | 257 GROUP : 4 |
| 258 | 258 GROUP : 4 | 258 GROUP : 4 |
| 259 | 259 GROUP : 4 | 259 GROUP : 4 |
| 260 | 260 GROUP : 4 | 260 GROUP : 4 |
| 261 | 261 GROUP : 4 | 261 GROUP : 4 |
| 262 | 262 GROUP : 4 | 262 GROUP : 4 |
| 263 | 263 GROUP : 4 | 263 GROUP : 4 |
| 264 | 264 GROUP : 4 | 264 GROUP : 4 |
| 265 | 265 GROUP : 4 | 265 GROUP : 4 |
| 266 | 266 GROUP : 4 | 266 GROUP : 4 |
| 267 | 267 GROUP : 4 | 267 GROUP : 4 |
| 268 | 268 GROUP : 4 | 268 GROUP : 4 |
| 269 | 269 GROUP : 4 | 269 GROUP : 4 |
| 270 | 270 GROUP : 4 | 270 GROUP : 4 |
| 271 | 271 GROUP : 4 | 271 GROUP : 4 |
| 272 | 272 GROUP : 4 | 272 GROUP : 4 |
| 273 | 273 GROUP : 4 | 273 GROUP : 4 |
| 274 | 274 GROUP : 4 | 274 GROUP : 4 |
| 275 | 275 GROUP : 4 | 275 GROUP : 4 |
| 276 | 276 GROUP : 4 | 276 GROUP : 4 |
| 277 | 277 GROUP : 4 | 277 GROUP : 4 |
| 278 | 278 GROUP : 4 | 278 GROUP : 4 |
| 279 | 279 GROUP : 4 | 279 GROUP : 4 |
| 280 | 280 GROUP : 4 | 280 GROUP : 4 |
| 281 | 281 GROUP : 4 | 281 GROUP : 4 |
| 282 | 282 GROUP : 4 | 282 GROUP : 4 |
| 283 | 283 GROUP : 4 | 283 GROUP : 4 |
| 284 | 284 GROUP : 4 | 284 GROUP : 4 |
| 285 | 285 GROUP : 4 | 285 GROUP : 4 |
| 286 | 286 GROUP : 4 | 286 GROUP : 4 |
| 287 | 287 GROUP : 4 | 287 GROUP : 4 |
| 288 | 288 GROUP : 4 | 288 GROUP : 4 |
| 289 | 289 GROUP : 4 | 289 GROUP : 4 |
| 290 | 290 GROUP : 4 | 290 GROUP : 4 |
| 291 | 291 GROUP : 4 | 291 GROUP : 4 |
| 292 | 292 GROUP : 4 | 292 GROUP : 4 |
| 293 | 293 GROUP : 4 | 293 GROUP : 4 |
| 294 | 294 GROUP : 4 | 294 GROUP : 4 |
| 295 | 295 GROUP : 4 | 295 GROUP : 4 |
| 296 | 296 GROUP : 4 | 296 GROUP : 4 |
| 297 | 297 GROUP : 4 | 297 GROUP : 4 |
| 298 | 298 GROUP : 4 | 298 GROUP : 4 |
| 299 | 299 GROUP : 4 | 299 GROUP : 4 |
| 300 | 300 GROUP : 4 | 300 GROUP : 4 |
| 301 | 301 GROUP : 4 | 301 GROUP : 4 |
| 302 | 302 GROUP : 4 | 302 GROUP : 4 |
| 303 | 303 GROUP : 4 | 303 GROUP : 4 |
| 304 | 304 GROUP : 4 | 304 GROUP : 4 |
| 305 | 305 GROUP : 4 | 305 GROUP : 4 |
| 306 | 306 GROUP : 4 | 306 GROUP : 4 |
| 307 | 307 GROUP : 4 | 307 GROUP : 4 |
| 308 | 308 GROUP : 4 | 308 GROUP : 4 |

APPARATUS AND METHOD FOR HISTOGRAM ANALYSIS OF IMAGE AND LUMINANCE COMPENSATION APPARATUS USING THE SAME

CLAIM OF PRIORITY

This application claims the benefit of the earlier filing date, under 35 U.S.C. 119(a), to that patent application entitled "Apparatus And Method For Histogram Analysis Of Image And Luminance Compensation Apparatus Using The Same," filed in the Korean Intellectual Property Office on Feb. 8, 2006 and assigned Serial No. 2006-12144, the entire contents of which are incorporated herein by reference.

BACKGROUND OF THE INVENTION

1. Field of the Invention

The present invention relates to still image and a moving image processing, and more particularly to an apparatus and a method for analyzing a histogram, which represents the luminance characteristic and the contrast characteristic according to RGB colors of an image, and a luminance compensation apparatus using the same.

2. Description of the Related Art

In processing a still image and/or a moving image, it is necessary understand the characteristics of each corresponding image in order to apply a specific algorithm. In order to understand the characteristics of an image, a histogram analysis, which represents the luminance and contrast according to RGB colors of an image, is generally used.

According to the conventional computation method using luminance in order to analyze a histogram, luminance values of each pixel constituting a corresponding image in an input image are calculated, and the number of pixels having a corresponding luminance value is determined. The histogram is computing the number of pixels having a particular luminance value against the luminance values. Accordingly, the number of pixels as a function of specific luminance value is expressed in a graph by the histogram. In this case, when data of an input image correspond to data of an RGB domain, a histogram is computed after the data is mapped to a color space from which luminance components of the data can be extracted, or a histogram is computed with respect to each of RGB. Generally, the histogram computed as described above is used by converting histogram distribution into a monotonically increasing function, by accumulating the histogram distribution through a cumulative distribution function (CDF).

FIG. 1 is a block diagram schematically illustrating the construction of a conventional luminance compensation apparatus using a histogram analysis. The conventional luminance compensation apparatus includes a histogram analysis unit 10, a luminance compensation function generation unit 11, and a mapping unit 13. The histogram analysis unit 10 includes a probability density function (PDF) operator, calculates luminance values of each pixel constituting a corresponding image in an input image, and calculates the number of pixels corresponding to each luminance value, thereby analyzing a histogram. The luminance compensation function generation unit 11 includes a cumulative distribution function (CDF), computes a cumulative distribution of a histogram, and generates a mapping function for luminance compensation based on the computed cumulative distribution. The mapping unit 13 compensates luminance values of an input image according to the mapping function generated by the luminance compensation function generation unit 11.

FIGS. 2A to 2C are graphs illustrating an exemplary histogram, cumulative distribution function, and mapping function of an image, respectively. As shown in FIG. 2A, a histogram is obtained by classifying luminance values of an input image into 0 to 255 and making a graph showing the number of pixels as a function of each luminance value. FIG. 2B shows a cumulative distribution function generated by the luminance compensation function generation unit 11. In this case, for example, when an input image has a resolution of 720×480, the cumulative distribution function has 345,600 final cumulative values. FIG. 2C shows a mapping function, which may be a function obtained by converting the cumulative distribution function into a 256-level gray scale. Consequently, such a mapping function has output luminance values corresponding to luminance values of input pixels.

FIG. 3 is a view illustrating an image frame for explaining a general histogram analysis method for an image. As indicated by the arrows in FIG. 3, when analyzing a histogram for an input image, the histogram analysis unit 10 uses a so-called pixel-by-pixel analysis method in which all pixels constituting the image are sequentially examined.

However, such an analysis method requires a large amount of calculation for analysis of a large still image or a high-resolution moving image. Particularly, devices such as mobile terminals have recently shown a tendency to reproduce a digital multimedia broadcasting (DMB) signal and a moving-image file, and also to be equipped with a liquid crystal display (LCD) capable of displaying a high-resolution image. Therefore, when the histogram analysis method as described above is used to analyze a high-resolution moving image or the like in a mobile terminal having a relatively poorer calculation capability, there is a problem in that a great amount of hardware resources are required.

SUMMARY OF THE INVENTION

Accordingly, the present invention has been made to solve the above-mentioned problems occurring in the prior art and provides additional advantages, by providing an apparatus and a method for efficiently performing a histogram analysis for an image with only a small amount of calculation, and a luminance compensation apparatus using the same.

In accordance with one aspect of the present invention, there is provided an apparatus for analyzing a histogram of an image, the apparatus comprising an image input module for buffering an input image, a block calculator for performing a blocking operation for dividing the image, which has been input to the image input module, into pixel blocks of a predetermined size, and extracting and outputting a representative pixel of each block obtained by corresponding blocking. a probability density function (PDF) operator for calculating a first histogram by using all pixels of the image, which has been input to the image input module, and calculating a second histogram by using the representative pixels input from the block calculator and an image characteristic comparator for receiving the first and second histograms output from the PDF operator, testing if the received histograms satisfy a predetermined identity criterion by comparing characteristics of the first histogram with characteristics of the second histogram, and calculating a third histogram of the input image in a scheme for the blocking when it has been determined as a result of the test that the predetermined identity criterion is satisfied.

In accordance with another aspect of the present invention, there is provided an apparatus for luminance compensation through a histogram analysis of an image, the apparatus comprising a histogram analysis unit for calculating a first histogram by using all pixels of an input image, performing a blocking operation for dividing the input image into predetermined pixel blocks, calculating a second histogram by using a representative pixel of each block obtained by the blocking, performing a test operation to determine if characteristics of the histograms satisfy a predetermined identity criterion, and calculating and outputting a histogram of an input image by using the representative pixels obtained by the blocking when it has been determined as a result of the test that the predetermined identity criterion is satisfied, a luminance compensation function generation unit for calculating cumulative distribution of the histogram, and generating a mapping function for luminance compensation based on the cumulative distribution and a mapping unit for compensating a luminance value of the input image according to the mapping function generated by the luminance compensation function generation unit.

In accordance with still another aspect of the present invention, there is provided a method for luminance compensation through a histogram analysis of an image, the method comprising the steps of calculating a first histogram by examining all pixels in an input predetermined image frames, and determining a type of the first histogram as a reference histogram type, calculating a second histogram by examining a representative pixel of each block obtained by blocking, which divides each of the input image frames into pixel blocks according to a plurality of predetermined sizes, and determining a type of the second histogram as a comparison histogram type, checking an identity between the reference histogram types and the comparison histogram types, and obtaining a block which has a largest size while satisfying an identity rate with respect to a predetermined reference value, and calculating a third histogram by performing a blocking operation for the input image frame based on the obtained largest block and actually outputting the third histogram.

BRIEF DESCRIPTION OF THE DRAWINGS

The above features and advantages of the present invention will be more apparent from the following detailed description taken in conjunction with the accompanying drawings, in which:

FIGS. 7A to 7C are views illustrating comparison test result lists with respect to a histogram analysis of the present invention and a conventional histogram analysis.

DETAILED DESCRIPTION

Hereinafter, one embodiment according to the present invention will be described with reference to the accompanying drawings. In the below description, many particular items such as a detailed component device are shown, but these are given only for providing a better understanding of the present invention. Therefore, it will be understood by those skilled in the art that various changes in form and detail may be made within the scope of the present invention.

Figure 4:
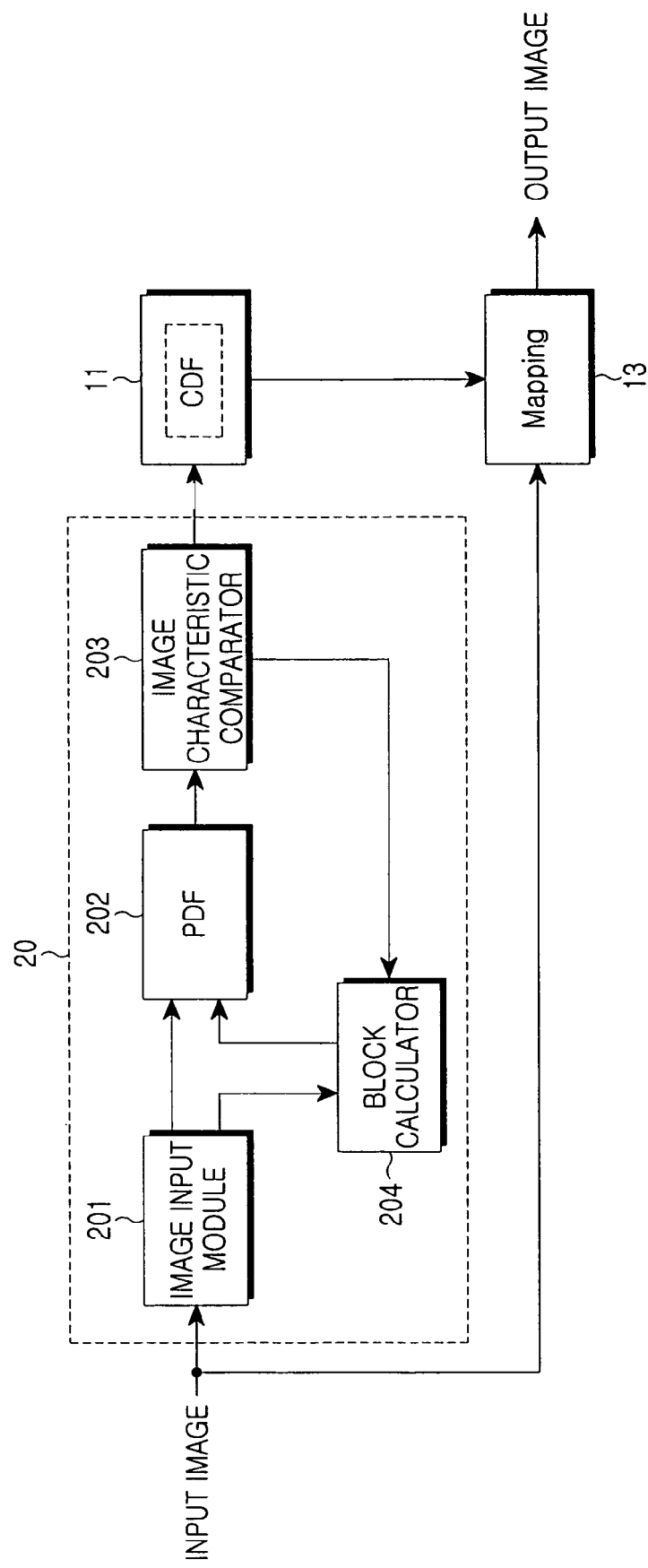
FIG. 4 is a block diagram illustrating the construction of a luminance compensation apparatus using a histogram analysis according to an embodiment of the present invention.

FIG. 4 is a block diagram illustrating the construction of a luminance compensation apparatus using a histogram analysis according to an embodiment of the present invention. The luminance compensation apparatus as shown in FIG. 4 includes a histogram analysis unit 20, a luminance compensation function generation unit 11, and a mapping unit 13.

The histogram analysis unit 20 calculates a first histogram by using all pixels of an input image. Also, the histogram analysis unit 20 performs a blocking operation for grouping all pixels of the input image into 2×2 blocks, 4×4 blocks, or 8×8 blocks, and calculates a second histogram by using only representative pixels in each block obtained by the blocking operation. Then, the histogram analysis unit 20 performs a test operation to determine if the characteristics of the first and second histograms satisfy an identity criterion therebetween, and calculates a third histogram of an input image by examining only representative pixels obtained by the blocking when it is determined as a result of the test operation that the identity criterion is satisfied.

Figure 1:
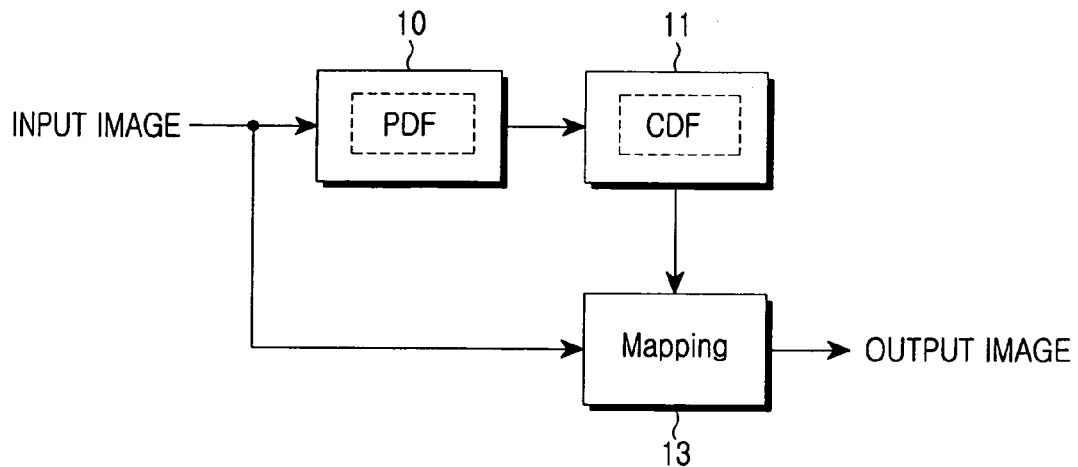
FIG. 1 is a block diagram schematically illustrating the construction of a conventional luminance compensation apparatus using a histogram analysis.
Figure 2A:
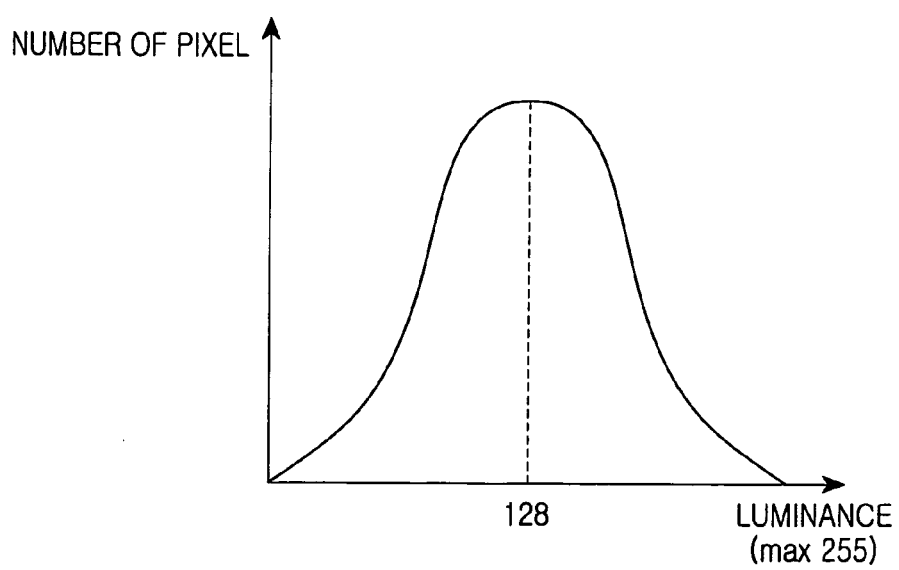
FIGS. 2A to 2C are graphs illustrating an exemplary histogram, cumulative distribution function, and mapping function of an image, respectively, which has been obtained from the apparatus of FIG. 1.
Figure 2B:
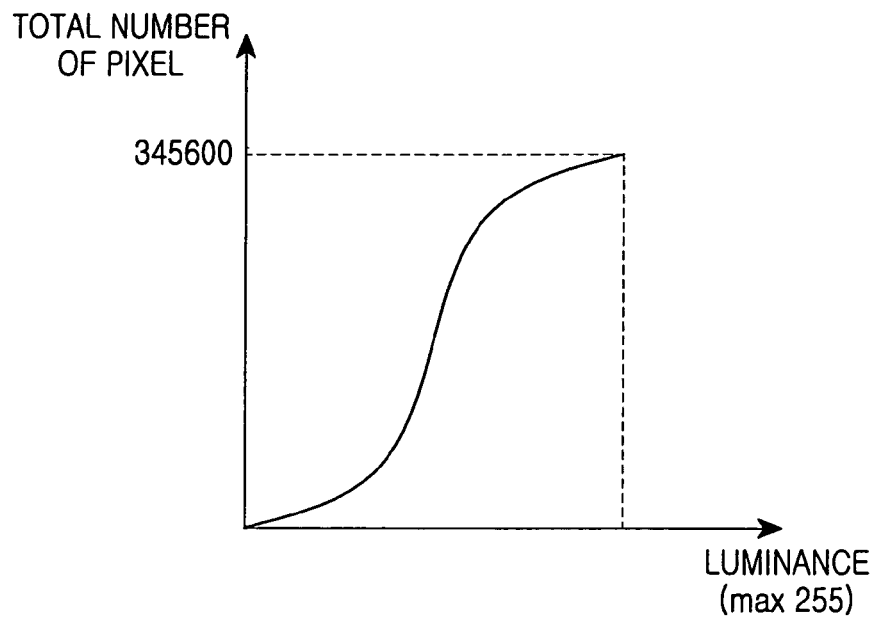
Figure 2C:
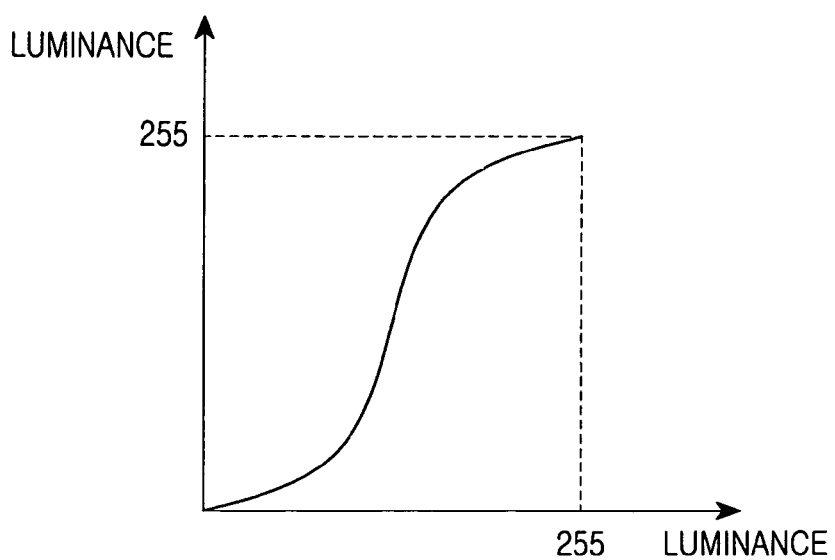
Figure 3:
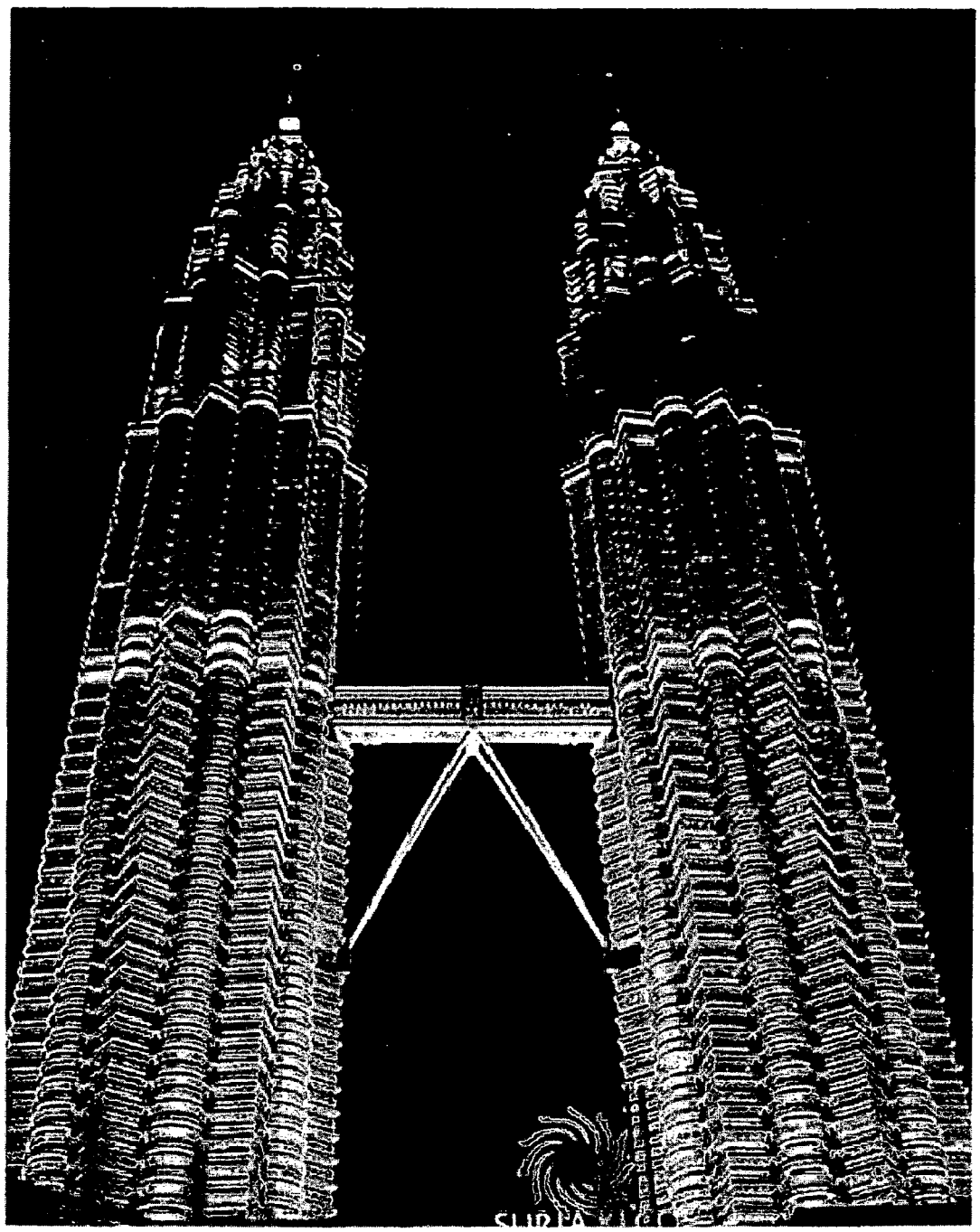
FIG. 3 is a view illustrating an image frame for explaining a general histogram analysis method for an image.

The luminance compensation function generation unit 11 calculates cumulative distribution of a histogram, and generates a mapping function for luminance compensation based on the cumulative distribution. The mapping unit 13 compensates luminance values of an input image according to the mapping function generated by the luminance compensation function generation unit 11. The constructions and operations of the luminance compensation function generation unit 11 and mapping unit 13 may be substantially the same as, or equivalent to, those of corresponding components in the conventional apparatus shown in FIG. 1.

In detail, the histogram analysis unit 20 includes an image input module 201, a probability density function (PDF) operator 202, an image characteristic comparator 203, and a block calculator 204. The image input module 201 receives and buffers an input image. The block calculator 204 performs the blocking operation for dividing an input image into a block(s) (e.g., 2×2 blocks, 4×4 blocks, or 8×8 blocks), and extracts and outputs only a representative pixel of each block obtained by the blocking operation. The PDF operator 202 calculates the first histogram by using all pixels of the input image and calculates the second histogram by using only pixels input from the block calculator 204. The image characteristic comparator 203 receives the first and second histograms output from the PDF operator 202, and tests if the histograms satisfy a predetermined identity criterion by comparing the characteristics of the second histogram with the characteristics of the first histogram. When the first and second histograms satisfy the predetermined identity criterion, the image characteristic comparator 203 calculates a third histogram of the input image in the scheme for the blocking, and outputs the calculated histogram.

Figure 5:
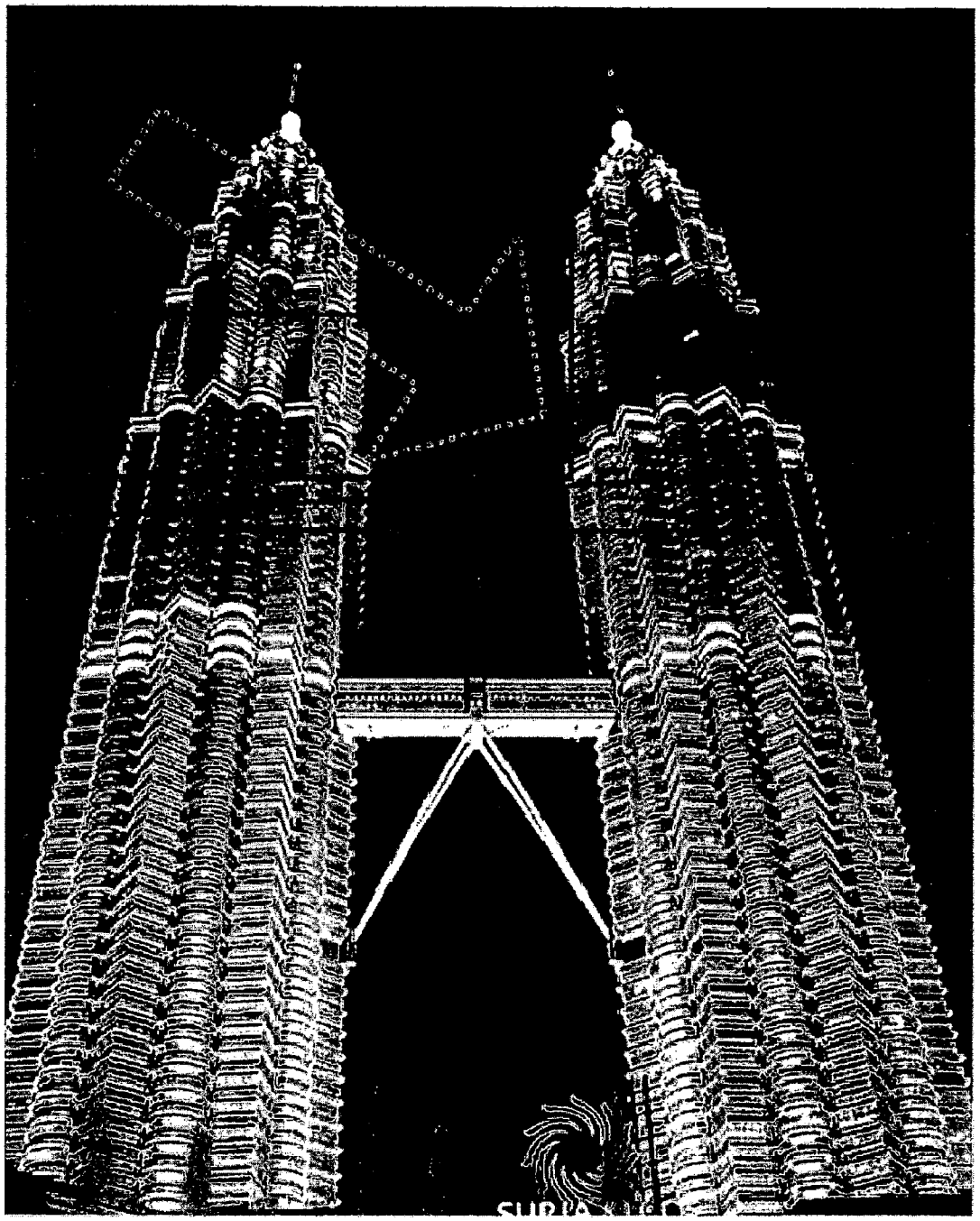
FIG. 5 is a view illustrating an image frame for explaining a histogram analysis method for an image according to an embodiment of the present invention.

FIG. 5 is a view illustrating an image frame for explaining a histogram analysis method for an image according to an embodiment of the present invention. In FIG. 5, square blocks having a size which increases along a large broken arrow are shown as examples of blocking. Only representative pixels (e.g., any single pixel in a block, an average of all the pixels in the block, a weighted average of selected pixels in a block) obtained by each blocking operation are extracted as a corresponding block is moved in a direction indicated by the small solid arrow, and then histograms are calculated by using only the representative pixels.

In this case, since the first histogram is calculated by using all pixels of the image and the second histogram is calculated by using only representative pixels of an image obtained by the blocking operation a difference in the number of examined pixels exists and the two histograms cannot be equal to each other. However, the characteristics of the two histograms, i.e., the types of the histograms can be similar or substantially equal to each other.

Figure 6:
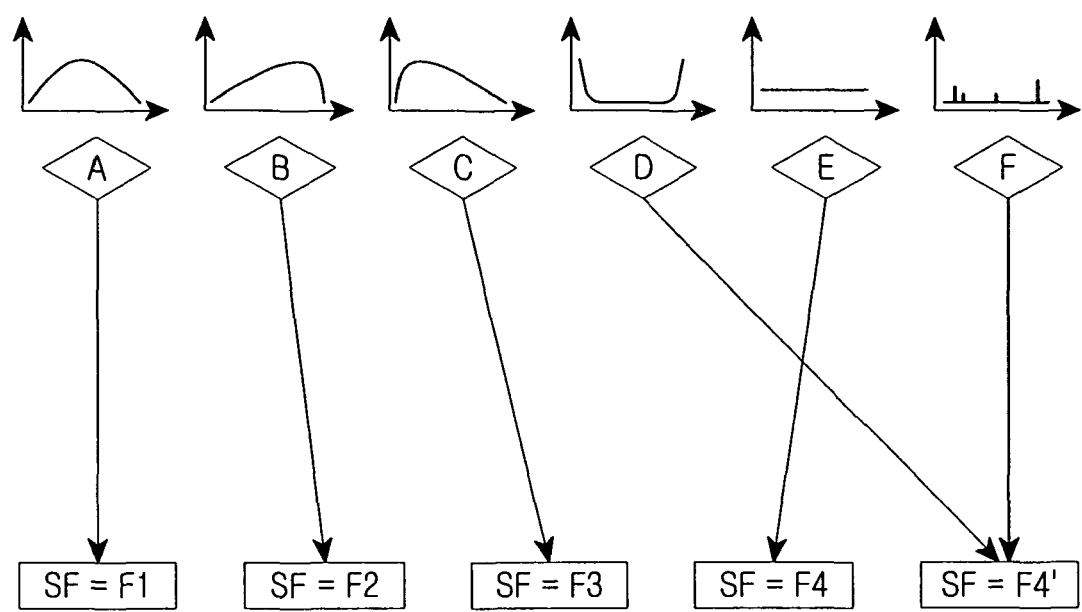
FIG. 6 is a view illustrating various types of histograms for a histogram analysis according to an embodiment of the present invention.

As shown in FIG. 6, the types of first and second histograms may be classified into a plurality of types, i.e., into types A, B, C, D, E, and F. In FIG. 6, type A represents a histogram type of an image which includes a significant number of pixels having a middle luminance value, type B represents a histogram type of an image which includes a significant number of high luminance pixels, type C represents a histogram type of an image which includes a significant number of low luminance pixels, type D represents a histogram type of an image which includes a significant number of low luminance pixels and a significant number of high luminance pixels, type E represents a histogram type of an image in which pixels have uniform luminance, and type F represents a histogram type of an image in which pixels having a specific luminance value exist only in a part of the image.

The image characteristic comparator 203 (FIG. 4) may determine that the above-mentioned identity criterion is satisfied only when the characteristic of the first histogram, calculated by using all pixels of an image of one frame, is the same as or substantially the same as that of the second histogram, calculated by using representative pixels of the image obtained by the blocking operation. However, particularly in the case in which an input image is a moving image, the image characteristic comparator 203 may determine that the above-mentioned identity criterion is satisfied, when several hundred to several thousand frames of images have been tested and 95% or more of the tested images have a characteristic satisfying the above-mentioned identity criterion.

FIGS. 7A to 7C are views illustrating comparison test result lists with respect to a histogram analysis of the present invention and a conventional histogram analysis. Among the lists shown in FIGS. 7A to 7C, a first clause of a list in FIG. 7A is as shown in Table 1.

TABLE 1

| 1 | 1 Group: 4 | 1 Group: 4 |
|---|---|---|

In Table 1, "1" in a first column represents a frame number, and a first "1 Group: 4" in a second column represents that the type of a histogram calculated by using all pixels of a frame having a corresponding number (i.e., No. 1) corresponds to type 4. Also, a "1 Group: 4" in the second column represents that the type of histogram calculated by using representative pixels obtained by blocking of the frame having a corresponding number (i.e., No. 1) corresponds to type 4. As shown in Table 1, it can be understood as a result of comparison that the types of the two histograms are equal to each other.

Referring to FIGS. 7A to 7C, it can be understood that the types of histograms only for frame Nos. 25 and 138 are not equal to each other. As described above, the image characteristic comparator 203 may test several hundred to several thousand frames of images in order to determine whether or not there is an identity between two types of histograms.

By the constructions and operations of the image input module 201, PDF operator 202, image characteristic comparator 203, and block calculator 204, as described above, the histogram analysis unit 20 can calculate a histogram of an input image by examining only representative pixels obtained by blocking of the input image, thereby improving a calculation performance for a histogram analysis.

Meanwhile, a blocking operation of the block calculator 204 for dividing an image into at least one known block size (2×2 blocks, 4×4 blocks, or 8×8 blocks) may be performed based on one preset block size, or may be established to set an optimum block size after testing blocks of various sizes, step by step. That is, it is possible that the block calculator 204 performs a blocking operation according to each block size, and the image characteristic comparator 203 checks the characteristics of each histogram calculated according to each block size and controls the block calculator 204 to perform a blocking operation by using the largest block which satisfies the identity criterion.

Figure 8:
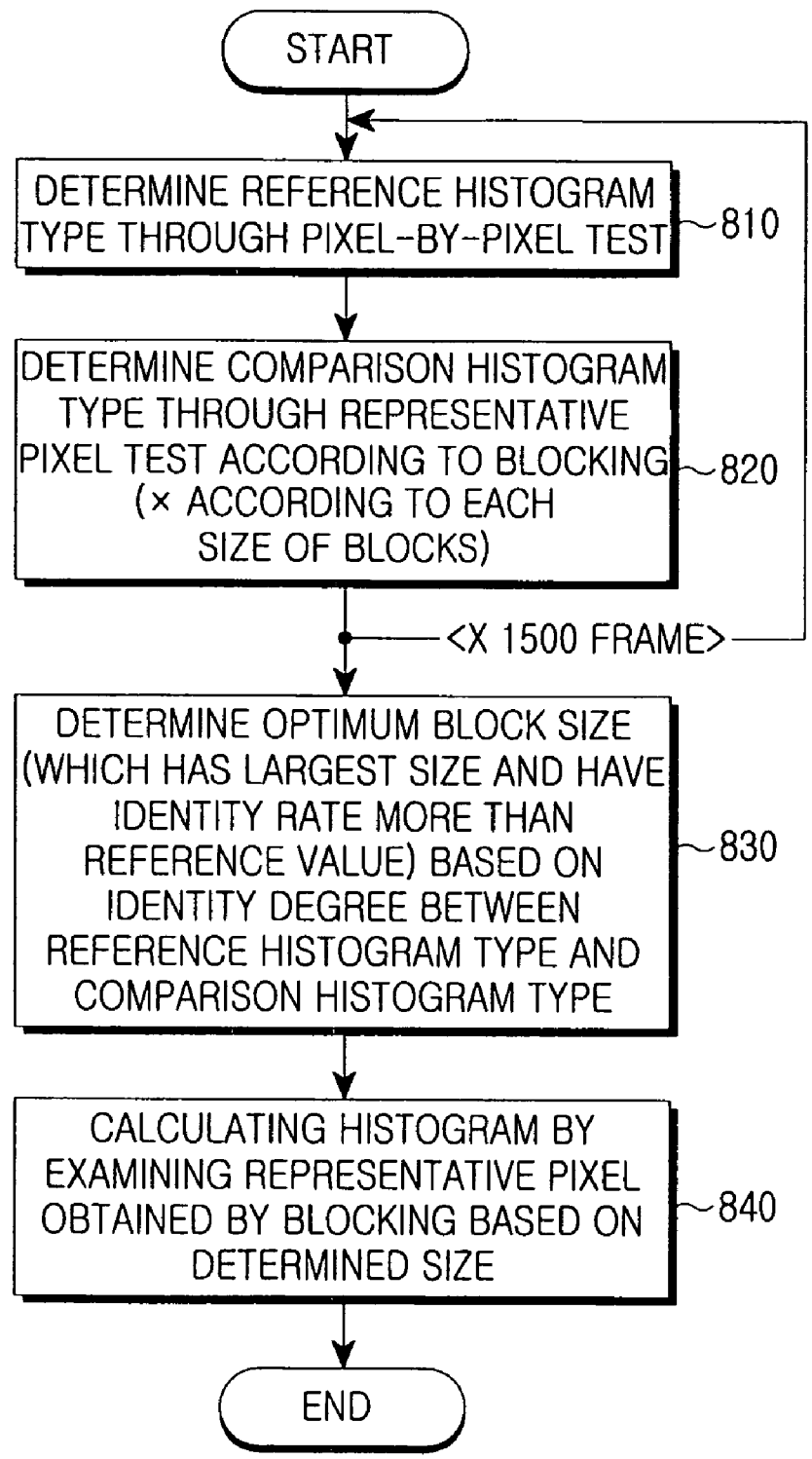
FIG. 8 is a flowchart illustrating a histogram analysis procedure according to an embodiment of the present invention.

FIG. 8 is a flowchart illustrating a histogram analysis procedure according to an embodiment of the present invention. According to the histogram analysis procedure according to an embodiment of the present invention, when a moving image is input, a first histogram is calculated by examining all pixels, the characteristic of the first histogram (i.e., the type of the first histogram) is identified, and the type of the first histogram is determined as a reference histogram type (step 810). In step 820, a second histogram is calculated by examining representative pixels obtained by a blocking operation, the type of the second histogram is identified, and the type of the second histogram is determined as a comparison histogram type. Also, in step 820, it is possible to examine representative pixels according to each size of predetermined multiple blocks and determine comparison histogram types according to each size of the blocks.

The steps 810 and 820 may be repeated for each of a plurality of frames, for example, 1,500 frames. Thereafter, the reference histogram type is compared with each of comparison histogram types in order to determine whether or not there is an identity therebetween, thereby determining an optimum block size (step 830). That is, it is possible to obtain a block which has the largest size while satisfying an identity rate with respect to a reference value, and to determine the size of the obtained block as an optimum block size. In step 840, a histogram of a following image is calculated by examining representative pixels of the following image based on the determined block size.

The histogram analysis operation according to an embodiment of the present invention may be performed as shown in FIG. 8, and such an operation may be performed according to each broadcasting program in the case of DMB signals.

As described above, the histogram analysis method for an image according to the present invention can increase the efficiency of a histogram analysis, which is required for grasping the characteristics of a still image or a moving image. Also, the histogram analysis method according to the present invention can be more efficiently utilized when the method is applied to a mobile terminal or the like, which has a relatively poorer calculation capability.

The processing described herein may be performed in a computing system or processor executing software instruction or code. The code may further be stored in a memory, e.g., RAM, ROM, in communication with the processor or computer system. The code may be loaded into the memory via a computer-readable medium, such as a CD. Or the code may be downloaded into the memory electronically through a network.

While the present invention has been shown and described with reference to certain preferred embodiments of the histogram analysis apparatus and method for an image and the luminance compensation apparatus using the same, it will be understood by those skilled in the art that various changes in form and details may be made therein without departing from the spirit and scope of the invention as defined by the appended claims. For example, according to another embodiment of the present invention, it is possible that the histogram analysis unit performs a blocking operation for dividing an input image into 2×2 blocks, 4×4 blocks, or 8×8 blocks, and calculates histograms of following images by using only representative pixels of each block obtained by corresponding blocking, thereby further simplifying the construction of the histogram analysis unit.

Accordingly, the scope of the invention is not to be limited by the above embodiments but by the claims and the equivalents thereof.

What is claimed is:

1. An apparatus for analyzing a histogram of an image, the apparatus comprising:
    an image input module for buffering an input image;
    a block calculator for:
        performing a blocking operation for dividing the image, which has been input to the image input module, into pixel blocks of a predetermined size, and
        extracting and outputting a representative pixel of each block obtained by corresponding blocking, wherein the representative pixel is selected as at least one of the pixels in an associated pixel block;
    a probability density function (PDF) operator for:
        calculating a first histogram by using all pixels of the image, which has been input to the image input module, and
        calculating a second histogram of the image by using the representative pixels input from the block calculator, said representative pixels being associated with corresponding pixels blocks; and
    an image characteristic comparator for:
        receiving the first and second histograms output from the PDF operator,
        testing if the received histograms satisfy a predetermined identity criterion by comparing characteristics of the first histogram with characteristics of the second histogram, and
        calculating a third histogram of a following input image based on representative pixel values of the following image associated with a block size obtained as a result of satisfying the predetermined identity criterion.

2. The apparatus as claimed in claim 1, wherein the block calculator performs the blocking operation while increasing a block size step by step, and the image characteristic comparator controls the block calculator to perform the blocking operation by using a block with a largest size satisfying the predetermined identity criterion.

3. An apparatus for luminance compensation through a histogram analysis of an image, the apparatus comprising:
    a histogram analysis unit for;
        calculating a first histogram by using all pixels of said input image,
        performing a blocking operation for dividing the input image into predetermined pixel blocks,
        calculating a second histogram of the input image by using a representative pixel of each block obtained by the blocking operation, wherein the representative pixel is selected as at least one of the pixels in an associated block,
        performing a test operation to determine if characteristics of the first and second histograms satisfy a predetermined identity criterion, and
        calculating and outputting a third histogram of a following input image by using values of representative pixels obtained by the blocking operation satisfying a predetermined identity criterion;
    a luminance compensation function generation unit for;
        calculating cumulative distribution of the histogram, and
        generating a mapping function for luminance compensation based on the cumulative distribution; and
    a mapping unit for compensating a luminance value of the input image according to the mapping function generated by the luminance compensation function generation unit.

4. The apparatus as claimed in claim 3, wherein the histogram analysis unit comprises:
    an image input module for receiving and buffering the input image;
    a block calculator for performing the blocking operation with respect to the image, which has been input to the image input module, and extracting and outputting the representative pixels associated with each block;
    a probability density function (PDF) operator for calculating the first histogram by using all pixels of the image, which has been input to the image input module, and calculating the second histogram by using the representative pixels input from the block calculator; and
    an image characteristic comparator for receiving the first and second histograms output from the PDF operator, testing if the received histograms satisfy the predetermined identity criterion, and calculating and outputting a third histogram of the following input image according to a blocking size satisfying the predetermined identity criterion.

5. The apparatus as claimed in claim 4, wherein the block calculator performs the blocking operation while increasing the block size step by step, and the image characteristic comparator controls the block calculator to perform the blocking operation by using a block with a largest size satisfying the predetermined identity criterion.

6. An apparatus for luminance compensation through a histogram analysis of an image, the apparatus comprising:
    a histogram analysis unit for performing a blocking operation for dividing an input image into predetermined pixel blocks, and calculating and outputting a histogram of the input image by using a representative pixel of each block obtained by the blocking operation, wherein the representative pixel is selected as at least one of the pixels in an associated block and wherein a size of a block is determined based on a matching of a histogram type of all the pixels in the input image and the histogram type of the histogram of the input image obtained using the representative pixels;
    a luminance compensation function generation unit for calculating cumulative distribution of the histogram, and generating a mapping function for luminance compensation based on the cumulative distribution; and
    a mapping unit for compensating a luminance value of the input image according to the mapping function generated by the luminance compensation function generation unit.

7. A method for luminance compensation through a histogram analysis of an image, the method comprising the steps of:

calculating a first histogram by examining all pixels of each of a plurality of predetermined input image frames, and determining a type of the first histogram as a reference histogram type;

calculating a second histogram of the input images frames by examining a representative pixel of each block obtained by a blocking operation, the blocking operation dividing each of the input image frames into pixel blocks according to a plurality of predetermined sizes, and determining a type of the second histogram as a comparison histogram type, wherein the representative pixel is selected as at least one of the pixels in an associated block;

checking an identity between the reference histogram types and the comparison histogram types, and obtaining a block that has a largest size while satisfying an identity rate with respect to a predetermined reference value; and calculating a third histogram of a following input image frame based on representative pixel values of the obtained largest block and outputting the third histogram.

8. The method as recited in claim 7, wherein the step of checking an identity between the reference histogram types and the comparison histogram types comprises the steps of:

comparing the reference histogram types and of each of the associated comparison histogram types of associated with a block size for each of a plurality of reference types and comparison histogram types; and determining an identity based on a number of similar types being greater than a predetermined value.

9. An apparatus for luminance compensation through a histogram analysis of an image, the apparatus comprising:

a processor in communication with a memory, the processor executing the steps of:

determining a first histogram of all pixels of each of a plurality of input predetermined image frames, and determining a type of the first histogram as a reference histogram type;

determining a second histogram of the input predetermined image frames by examining a representative pixel of each block obtained by a blocking operation, wherein the representative pixel is selected as at least one of the Pixels in an associated block;

determining a type of the second histogram as a comparison histogram type;

checking an identity between the reference histogram types and the comparison histogram types, and obtaining a block that has a largest size while satisfying an identity with respect to a predetermined reference value; and calculating a third histogram of a following input image frame based on representative pixel values of the obtained largest block and outputting the third histogram.

10. The apparatus as recited in claim 9, wherein the blocking operation divides each of the input image frames into pixel blocks according to a plurality of predetermined sizes.

11. The apparatus as recited in claim 10, wherein the pixel block size is selected from at least one size selected from the group consisting of: 2×2, 4×4 and 8×8.

12. The apparatus as recited in claim 9, further comprising; an input/output device in communication with the processor.

13. The apparatus as recited in claim 9, wherein the code is stored in the memory.

14. The apparatus as recited in claim 9, wherein the histogram types are selected from the group consisting of: a number of pixels having a middle luminance value, a number of high luminance pixels, a number of low luminance pixels, a number of low luminance pixels and a number of high luminance pixels, uniform luminance, and a specific luminance value exist only in a part of the image.

* * * * *

UNITED STATES PATENT AND TRADEMARK OFFICE
CERTIFICATE OF CORRECTION

PATENT NO.       : 8,023,731 B2                                            Page 1 of 1
APPLICATION NO.  : 11/636905
DATED            : September 20, 2011
INVENTOR(S)      : Jung-Hoon Park et al.

It is certified that error appears in the above-identified patent and that said Letters Patent is hereby corrected as shown below:

Column 9, Claim 8, Line 27 should read as follows:
-- ...histogram types associated... --

Signed and Sealed this
Seventeenth Day of July, 2012

David J. Kappos
*Director of the United States Patent and Trademark Office*